US012743749B2

(12) United States Patent
Chen et al.

(10) Patent No.: US 12,743,749 B2
(45) Date of Patent: Sep. 22, 2026

(54) IMAGE ADJUSTMENT METHOD AND ELECTRONIC DEVICE

(71) Applicant: Acer Incorporated, New Taipei City (TW)

(72) Inventors: Kuan-Ju Chen, New Taipei City (TW); Chao-Kuang Yang, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 208 days.

(21) Appl. No.: 18/797,525

(22) Filed: Aug. 8, 2024

(65) Prior Publication Data

US 2025/0348975 A1 Nov. 13, 2025

(30) Foreign Application Priority Data

May 13, 2024 (TW) ................................ 113117600

(51) Int. Cl.
*G06T 5/60* (2024.01)
*G06T 3/4046* (2024.01)
*G06T 7/90* (2017.01)

(52) U.S. Cl.
CPC .............. *G06T 5/60* (2024.01); *G06T 3/4046* (2013.01); *G06T 7/90* (2017.01); *G06T 2207/10016* (2013.01); *G06T 2207/10024* (2013.01); *G06T 2207/20081* (2013.01); *G06T 2207/20084* (2013.01)

(58) Field of Classification Search
CPC ........... G06T 5/60; G06T 3/4046; G06T 7/90; G06T 2207/10016; G06T 2207/10024; G06T 2207/20081; G06T 2207/20084
See application file for complete search history.

(56) References Cited

U.S. PATENT DOCUMENTS

2021/0360179 A1 11/2021 Dangi et al.
2023/0186612 A1* 6/2023 Marti ........................ G06T 5/60 382/159
2023/0308774 A1* 9/2023 Yang ...................... H04N 9/646
(Continued)

FOREIGN PATENT DOCUMENTS

CN 106296586 1/2017
CN 110555800 12/2019
CN 114255167 3/2022
(Continued)

*Primary Examiner* — John B Strege
(74) *Attorney, Agent, or Firm* — JCIPRNET

(57) ABSTRACT

An image adjustment method and an electronic device are disclosed. The method includes the following. An external image is captured through a camera lens to obtain a video stream. The video stream includes multiple first target images. The first target images are sequentially inputted to a first neural network model to perform first color space conversion and resolution enlarging on the first target images by the first neural network model and obtain multiple second target images according to an output of the first neural network model. The second target images are sequentially inputted to a second neural network model to perform second color space conversion on the second target images by the second neural network model and obtain multiple third target images according to an output of the second neural network model.

10 Claims, 3 Drawing Sheets

(56) References Cited

U.S. PATENT DOCUMENTS

| | | | | |
|---|---|---|---|---|
| 2025/0285219 | A1* | 9/2025 | Allen | G06T 3/4053 |

FOREIGN PATENT DOCUMENTS

| | | |
|---|---|---|
| CN | 115174839 | 10/2022 |
| TW | I315959 | 10/2009 |
| TW | I624804 | 5/2018 |
| TW | I756378 | 3/2022 |
| TW | 202336694 | 9/2023 |

* cited by examiner

Figure 2:
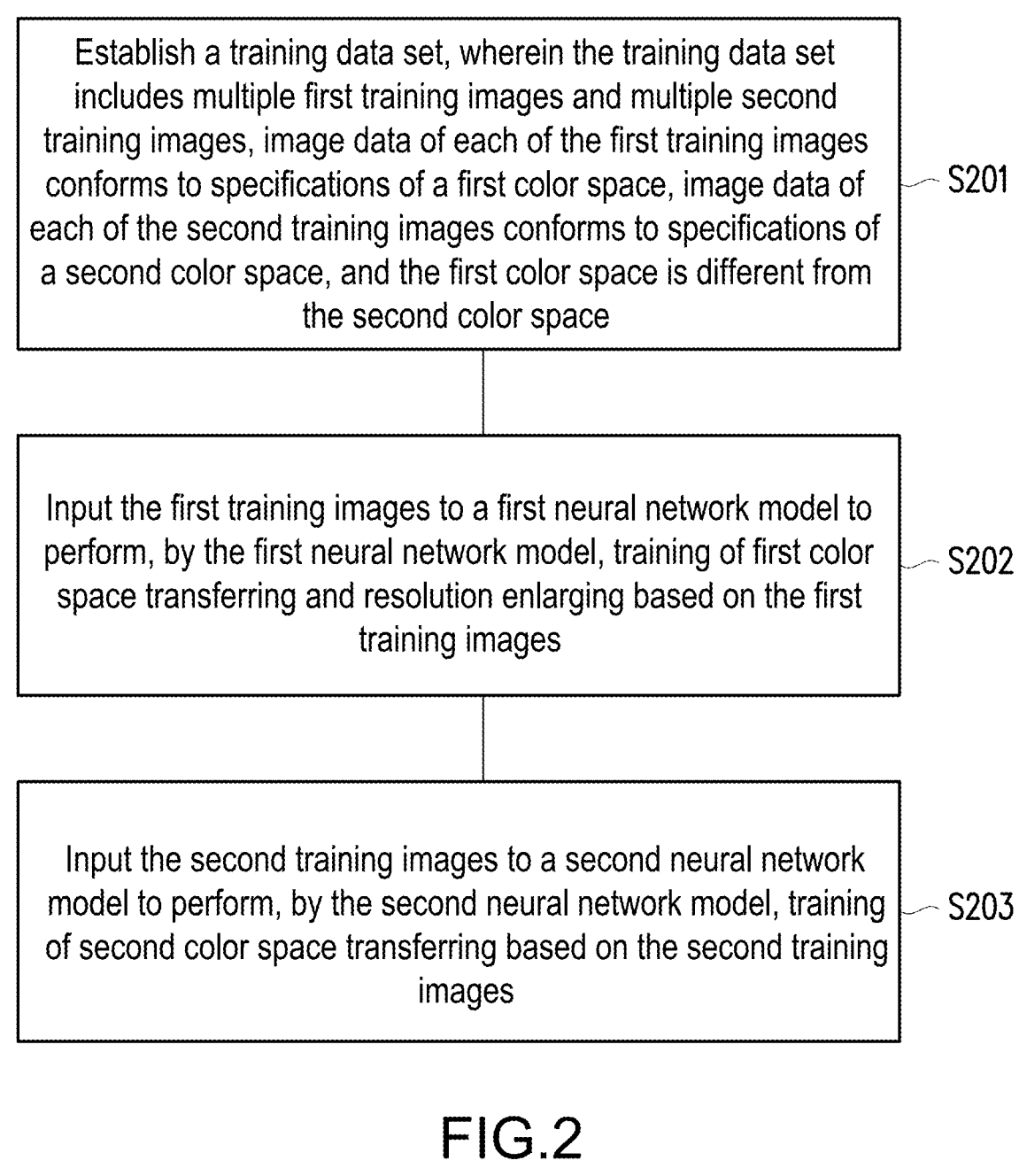

Establish a training data set, wherein the training data set includes multiple first training images and multiple second training images, image data of each of the first training images conforms to specifications of a first color space, image data of each of the second training images conforms to specifications of a second color space, and the first color space is different from the second color space

S201

Input the first training images to a first neural network model to perform, by the first neural network model, training of first color space transferring and resolution enlarging based on the first training images

S202

Input the second training images to a second neural network model to perform, by the second neural network model, training of second color space transferring based on the second training images

Figure 3:
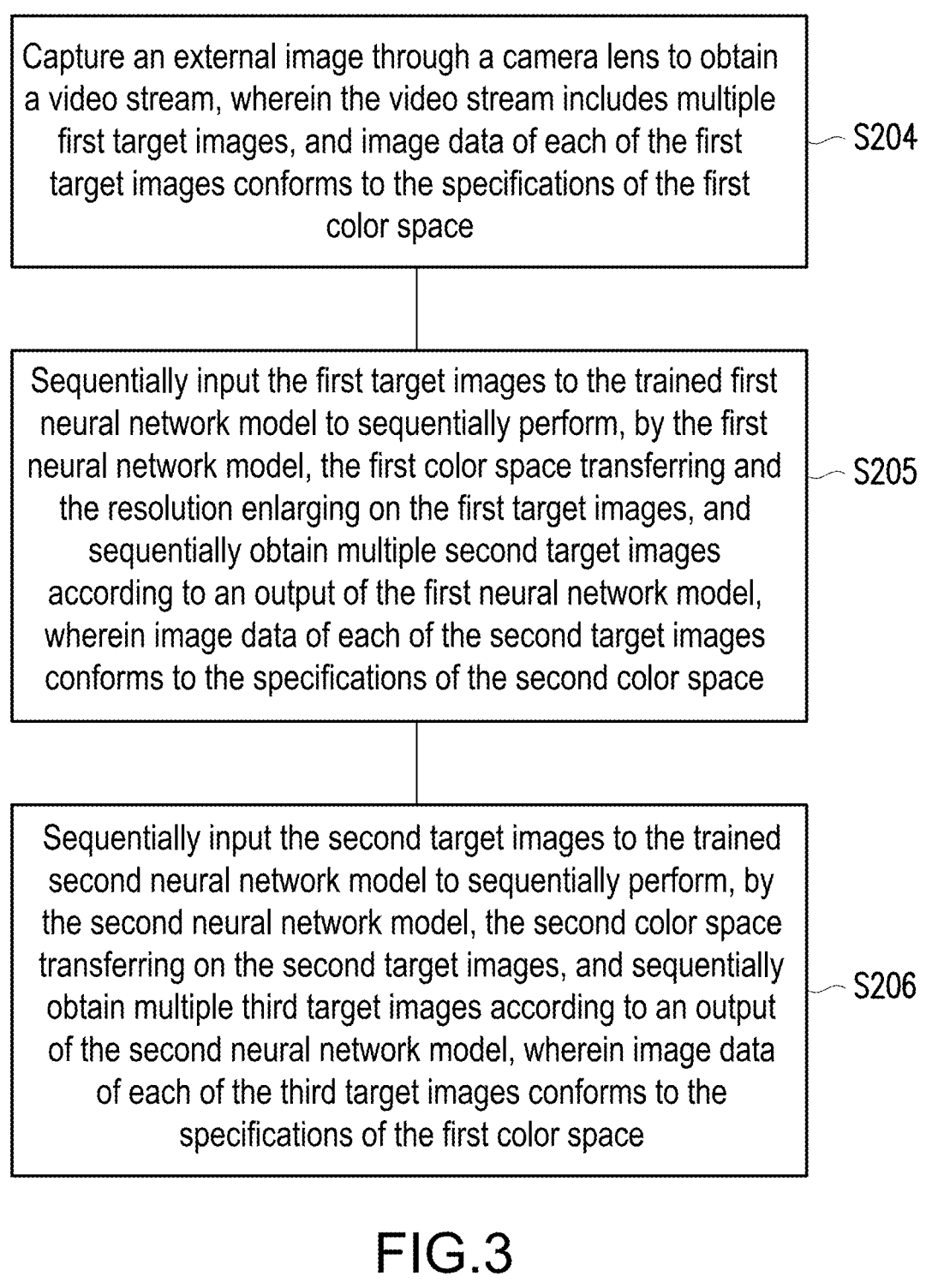

Capture an external image through a camera lens to obtain a video stream, wherein the video stream includes multiple first target images, and image data of each of the first target images conforms to the specifications of the first color space

S204

Sequentially input the first target images to the trained first neural network model to sequentially perform, by the first neural network model, the first color space transferring and the resolution enlarging on the first target images, and sequentially obtain multiple second target images according to an output of the first neural network model, wherein image data of each of the second target images conforms to the specifications of the second color space

S205

Sequentially input the second target images to the trained second neural network model to sequentially perform, by the second neural network model, the second color space transferring on the second target images, and sequentially obtain multiple third target images according to an output of the second neural network model, wherein image data of each of the third target images conforms to the specifications of the first color space

IMAGE ADJUSTMENT METHOD AND ELECTRONIC DEVICE

CROSS-REFERENCE TO RELATED APPLICATION

This application claims the priority benefit of Taiwan application serial no. 113117600, filed on May 13, 2024. The entirety of the above-mentioned patent application is hereby incorporated by reference herein and made a part of this specification.

BACKGROUND

Technical Field

The disclosure relates to an image adjustment method and an electronic device.

Description of Related Art

Some types of mobile phones or notebook computers support a slow-motion photography mode, which may improve a resolution of a captured image while reducing a frame rate, thereby generating a slow-motion image through the image post-production technology. However, if it is expected to quickly increase the resolution of the captured image without reducing the frame rate, most electronic devices may not meet this requirement.

SUMMARY

The disclosure provides an image adjustment method and an electronic device, which may implement high-efficiency resolution enlarging for consecutive images in a video stream.

An embodiment of the disclosure provides an image adjustment method, which includes the following. A training data set is established. The training data set includes multiple first training images and multiple second training images. Image data of each of the first training images conforms to specifications of a first color space. Image data of each of the second training images conforms to specifications of a second color space. The first color space is different from the second color space. The first training images are inputted to a first neural network model to perform, by the first neural network model, training of first color space conversion and resolution enlarging based on the first training images. The second training images are inputted to a second neural network model to perform, by the second neural network model, training of second color space conversion based on the second training images. An external image is captured through a camera lens to obtain a video stream. The video stream includes multiple first target images, and image data of each of the first target images conforms to the specifications of the first color space. The first target images are sequentially inputted to the trained first neural network model to sequentially perform, by the first neural network model, the first color space conversion and the resolution enlarging on the first target images, and sequentially obtain multiple second target images according to an output of the first neural network model. Image data of each of the second target images conforms to the specifications of the second color space. The second target images are sequentially inputted to the trained second neural network model to sequentially perform, by the second neural network model, the second color space conversion on the second target images, and sequentially obtain multiple third target images according to an output of the second neural network model. Image data of each of the third target images conforms to the specifications of the first color space.

An embodiment of the disclosure further provides an electronic device, which includes a camera lens, a storage circuit, and a processor. The processor is connected to the camera lens and the storage circuit. The storage circuit is configured to store a first neural network model and a second neural network model. The processor is configured to establish a training data set, in which the training data set includes multiple first training images and multiple second training images, image data of each of the first training images conforms to specifications of a first color space, image data of each of the second training images conforms to specifications of a second color space, and the first color space is different from the second color space; input the first training images to the first neural network model to perform, by the first neural network model, training of first color space conversion and resolution enlarging based on the first training images; input the second training images to the second neural network model to perform, by the second neural network model, training of second color space conversion based on the second training images; capture an external image through the camera lens to obtain a video stream, in which the video stream includes multiple first target images, and image data of each of the first target images conforms to the specifications of the first color space; sequentially input the first target images to the trained first neural network model to sequentially perform, by the first neural network model, the first color space conversion and the resolution enlarging on the first target images, and sequentially obtain multiple second target images according to an output of the first neural network model, in which image data of each of the second target images conforms to the specifications of the second color space; and sequentially input the second target images to the trained second neural network model to sequentially perform, by the second neural network model, the second color space conversion on the second target images, and sequentially obtain multiple third target images according to an output of the second neural network model, in which image data of each of the third target images conforms to the specifications of the first color space.

Based on the above, after the first training images that meet the specifications of the first color space and the second training images that meet the specifications of the second color space are used to train the first neural network model and the second neural network model, the first target images in the video stream obtained by capturing the external image through the camera lens may be inputted to the first neural network model to perform the first color space conversion and the resolution enlarging. The second target images obtained according to the output of the first neural network model may be inputted to the second neural network model to perform the second color space conversion. According to the output of the second neural network model, the third target images may be obtained. In this way, the image adjustment method and the electronic device in the disclosure may implement the high-efficiency resolution enlarging for the consecutive images in the video stream without affecting image quality.

BRIEF DESCRIPTION OF THE DRAWINGS

FIG. 2 is a flowchart of an image adjustment method according to an embodiment of the disclosure.

FIG. 3 is a flowchart of an image adjustment method according to an embodiment of the disclosure.

DETAILED DESCRIPTION OF DISCLOSED EMBODIMENTS

Figure 1:
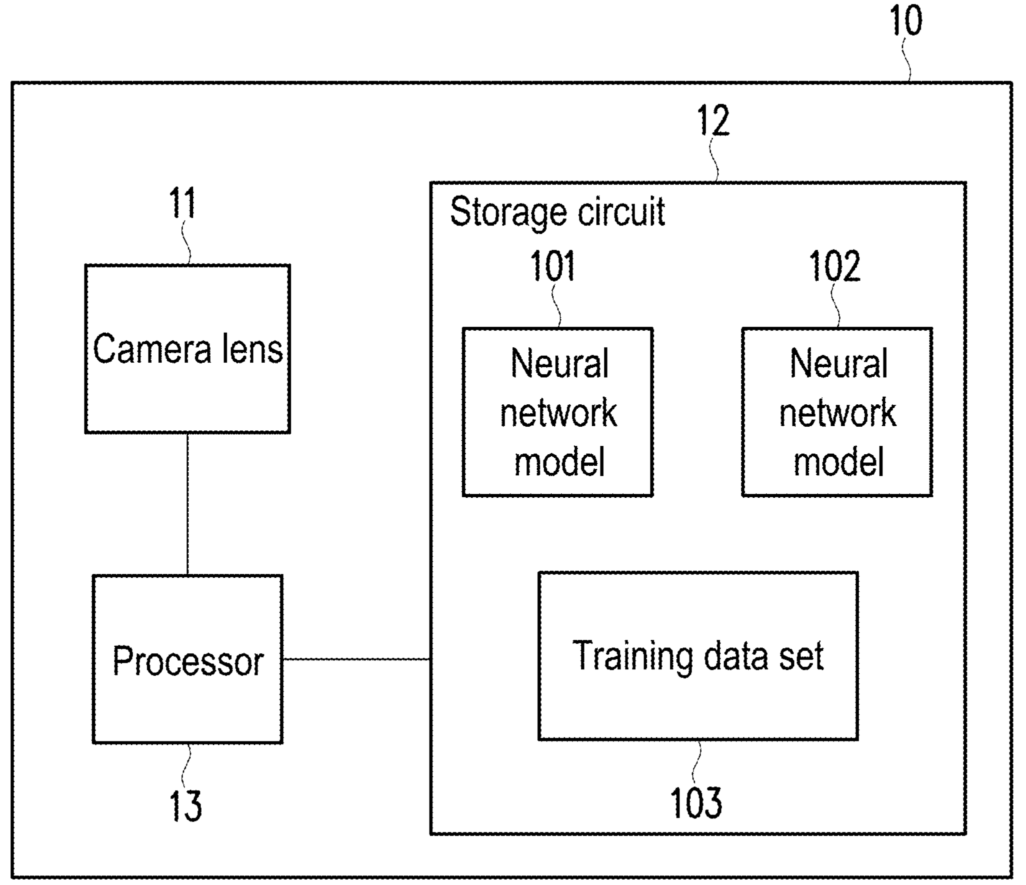
FIG. 1 is a schematic view of an electronic device according to an embodiment of the disclosure.

FIG. 1 is a schematic view of an electronic device according to an embodiment of the disclosure. Referring to FIG. 1, an electronic device 10 includes various electronic devices that support image capturing and image processing functions, such as smartphones, tablets, notebook computers, desktop computers, servers, game consoles, or on-board computers, and a type of the electronic device 10 is not limited thereto.

The electronic device 10 includes a camera lens 11, a storage circuit 12, and a processor 13. The camera lens 11 is configured to capture an external image and generate a video stream. Th video stream may reflect image content of the external image captured by the camera lens 11. For example, the camera lens 11 may include an image capturing module. The image capturing module may include image capturing elements such as lenses and photosensitive elements to achieve the image capturing function.

In an embodiment, the camera lens 11 is disposed in the electronic device 10. In an embodiment, the camera lens 11 is an external camera device, and is coupled to the electronic device 10. However, the disclosure does not limit the number and type of camera lenses 11.

The storage circuit 12 is configured to store data. For example, the storage circuit 12 may include a volatile storage circuit and a non-volatile storage circuit. The volatile storage circuit is configured to store the data in a volatile manner. For example, the volatile storage circuit may include random access memory (RAM) or similar volatile storage media. The non-volatile storage circuit is configured to store the data in a non-volatile manner. For example, the non-volatile storage circuit may include read only memory (ROM), a solid state disk (SSD), a hard disk drive (HDD), or similar non-volatile storage media. However, the disclosure does not limit the number and type of storage circuits 12.

The processor 13 is coupled to the camera lens 11 and the storage circuit 12. The processor 13 is responsible for all or a part of the operation of the electronic device 10. For example, the processor 13 may include a central processing unit (CPU), a graphic processing unit (GPU), other programmable general-purpose or special-purpose microprocessors, digital signal processors (DSP), programmable controllers, application specific integrated circuits (ASIC), programmable logic devices (PLD), or other similar devices or a combination of the devices. In an embodiment, the processor 13 may further include a processor dedicated to assisting in performing neural network computing and/or image processing such as a vision processing unit (VPU), a neural network processing unit (NPU), and/or a tensor processor (TPU). However, the disclosure does not limit the number and type of processors 13.

In an embodiment, the electronic device 10 may further include various input/output devices or peripheral devices such as a power management circuit, a network interface card, a mouse, a keyboard, a display, a speaker, and/or a microphone, and types of the input/output interface and the peripheral device is not limited thereto.

In an embodiment, the storage circuit 12 stores a neural network model 101 (also called a first neural network model) and a neural network model 102 (also called a second neural network model). The neural network model 101 is configured to perform color space conversion (also called first color space conversion) and resolution enlarging. The neural network model 102 is configured to perform another color space conversion (also called second color space conversion). For example, the neural network models 101 and 102 may achieve functions required to be performed by using convolutional neural networks (CNN) or other types of neural network architectures.

In an embodiment, the storage circuit 12 further stores a training data set 103. The training data set 103 includes multiple training images (also called first training images) for training the neural network model 101 and multiple training images (also called second training images) for training the neural network model 102. It should be noted that image data of each of the first training images conforms to specifications of a specific color space (also called a first color space), and image data of each of the second training images conforms to specifications of another color space (also called a second color space). The first color space is different from the second color space.

In an embodiment, the second color space at least includes a brightness channel, and the first color space does not include the brightness channel. For example, the first color space may be a color space such as RGB that does not include a Y channel (i.e., the brightness channel). For example, the second color space may be a color space including the Y channel such as YCrCb, YPrPb, or YUV. In an embodiment, compared to the first color space, human eyes are more sensitive to color changes in the second color space including the brightness channel.

In an embodiment, taking RGB and YCrCb as examples of the first color space and the second color space respectively, the image data of each of the first training images conforms to the specifications of the first color space, which means that pixel data in each of the first training images may carry three types of color information of R, G, and B, while the image data of each of the second training images conforms to the specifications of the second color space, which means that pixel data in each of the second training images may carry three types of color information of Y, Cr, and Cb. However, according to different first color spaces and/or second color spaces, the types of the color information carried by the pixel data in each of the first training images and/or the pixel data in each of the second training images may be adjusted according to practical requirements, and the disclosure is not limited thereto.

In an embodiment, a resolution (also called a second resolution) of each of the second training images is higher than a resolution (also called a first resolution) of each of the first training images. For example, assuming that the resolution (i.e., the first resolution) of each of the first training images is 1280×720, the resolution (i.e., the second resolution) of each of the second training images may be 1920×1080. However, in an embodiment, the first resolution and/or the second resolution may also be adjusted according to the practical requirements as long as the second resolution is higher than the first resolution.

In an embodiment, the processor 13 may input the first training images to the neural network model 101, so that the neural network model 101 performs training of the first color space conversion and the resolution enlarging based on the first training images. The first color space conversion is used to sequentially convert the first training images from conforming to the specifications of the first color space to conforming to the specifications of the second color space.

In addition, the resolution enlarging is used to perform the resolution enlarging on the first training images sequentially, for example, enlarging from the first resolution to the second resolution.

It should be noted that in an embodiment, by performing algorithm optimization on the neural network model 101, the neural network model 101 may simultaneously perform the first color space conversion and the resolution enlarging for each of the first training images. However, in an embodiment, the neural network model 101 may also be designed to first perform the first color space conversion and then perform the resolution enlarging for each of the first training images, the disclosure is not limited thereto.

In an embodiment, in a process of performing the training of the first color space conversion and the resolution enlarging on the neural network model 101, multiple verification images (also called first verification images) corresponding to the first training images may be to verify training results of the neural network model 101 using the first training images. For example, the processor 13 may compare an output image (also called a first output image) obtained by the neural network model 101 performing the first color space conversion and the resolution enlarging on a certain first training image to the first verification image corresponding to the first training image. If a difference between the first training image and the first verification image is less than a critical value (also called a first critical value), the processor 13 may maintain (i.e., not update) at least some of operation parameters (e.g., weight values) in the neural network model 101. However, if the difference between the first training image and the first verification image is not less than the first critical value, the processor 13 may update at least some of the operation parameters (e.g., the weight values) in the neural network model 101. In this way, by using the first training images to perform the training of the first color space conversion and the resolution enlarging on the neural network model 101, at least some of the parameters used by the neural network model 101 may be continuously optimized, so that accuracy and work efficiency of the neural network model 101 performing the first color space conversion and the resolution enlarging on a target image in the future may be gradually improved.

In an embodiment, the processor 13 may input the second training images to the neural network model 102, so that the neural network model 102 performs training of the second color space conversion based on the second training images. The second color space conversion is used to sequentially convert the second training images from conforming to the specifications of the second color space to conforming to the specifications of the first color space.

In an embodiment, in a process of performing the second color space conversion on the neural network model 102, multiple verification images (also called second verification images) corresponding to the second training images may be used to verify training results of the neural network model 102 using the second training images. For example, the processor 13 may compare an output image (also called a second output image) obtained by the neural network model 102 performing the second color space conversion on a certain second training image to the second verification image corresponding to the second training image. If a difference between the second training image and the second verification image is less than a critical value (also called a second critical value), the processor 13 may maintain (i.e., not update) at least some of operation parameters (e.g., weight values) in the neural network model 102. However, if the difference between the second training image and the second verification image is not less than the second critical value, the processor 13 may update at least some of the operation parameters (e.g., the weight values) in the neural network model 102. In this way, by using the second training images to perform the training of the second color space conversion on the neural network model 102, at least some of the parameters used by the neural network model 102 may be continuously optimized, so that accuracy and work efficiency of the neural network model 102 performing the second color space conversion on the target image in the future may be gradually improved.

In an embodiment, the processor 13 may capture the external image through the camera lens 11 to obtain the video stream that may reflect the external image. For example, the video stream includes multiple consecutive images (also called first target images). Image data of each of the first target images conforms to the specifications of the first color space. For example, taking RGB as an example of the first color space, pixel data in each of the first target images may carry the three types of color information of R, G, and B. However, according to different first color spaces, the type of the color information carried by the pixel data in each of the first target images may be adjusted according to the practical requirements, and the disclosure is not limited thereto. In addition, each of the first target images may have the first resolution.

In an embodiment, the processor 13 may sequentially input the first target images to the trained neural network model 101, so that the neural network model 101 sequentially performs the first color space conversion and the resolution enlarging on the first target images. Then, the processor 13 may sequentially obtain multiple images (also called second target images) according to an output of the neural network model 101. Image data of each of the second target images conforms to the specification of the second color space. For example, taking YCrCb as an example of the second color space, pixel data in each of the second target images may carry the three types of the color information of Y, Cr, and Cb. However, according to different second color spaces, the type of the color information carried by the pixel data in each of the second target images may be adjusted according to the practical requirements, and the disclosure is not limited thereto. In addition, each of the second target images may have the second resolution, and the second resolution may be higher than the first resolution. That is, a resolution of each of the second target images may be higher than a resolution of each of the first target images.

In an embodiment, the processor 13 may establish a conversion matrix (also called a first conversion matrix) based on a conversion function (also called a first conversion function). The neural network model 101 may perform the first color space conversion on the first target image based on the first conversion matrix to obtain the second target image. For example, the first conversion function may include the following formulas (1.1) to (1.3), and the first conversion matrix may include a conversion matrix (1.4).

$$Y \leftarrow (0.299 \times R) + (0.587 \times G) + (0.114 \times B) \tag{1.1}$$

$$Cr \leftarrow (0.5 \times R) - (0.418 \times G) - (0.081 \times B) \tag{1.2}$$

$$Cb \leftarrow (0.5 \times B) - (0.168 \times R) - (0.332 \times G) \tag{1.3}$$

$$\begin{bmatrix} 0.114 & 0.587 & 0.299 \\ -0.081 & -0.418 & 0.5 \\ 0.5 & -0.332 & -0.168 \end{bmatrix} \tag{1.4}$$

In the formulas (1.1) to (1.3), the three types of the color information of R, G, and B are the color information used for the first color space (i.e., an RGB color space), and the three types of the color information of Y, Cr, and Cb is the color information used for the second color space (i.e., a YCrCb color space). In an embodiment, each of the pixel data in the first target image may carry a set of the color information of R, G, and B, and each of the pixel data in the second target image may carry a set of the color information of Y, Cr, and Cb. Each of parameters in the conversion matrix (1.4) is a convolution operator used by the neural network model 101 when performing the first color space conversion. The neural network model 101 may perform a convolution operation on the first target image based on the conversion matrix (1.4) to generate the second target image.

It should be noted that in the formulas (1.1) to (1.3) and the conversion matrix (1.4), when calculating Cr, the processor 13 may set a conversion weight of an R channel (i.e., a red channel) to "0.5", and when calculating Cb, the processor 13 may set a conversion weight of a B channel (i.e., a blue channel) to "0.5". In this way, when the first color space conversion is performed, image distortion for the R channel and the B channel between the first target image and the second target image may be reduced (for example, a color difference between the first target image and the second target image for red and blue may be reduced). In addition, both the first conversion function and the first conversion matrix may be adjusted according to the practical requirements, such as adjustment for different color spaces, characteristics of the neural network model, and/or characteristics of the image to be processed, and the disclosure is not limited thereto.

It should be noted that in an embodiment, the neural network model 101 may simultaneously perform the first color space conversion and the resolution enlarging for each of the first target images to generate the corresponding second target image. However, in an embodiment, the neural network model 101 may also be designed to first perform the first color space conversion and then perform the resolution enlarging for each of the first target images, and the disclosure is not limited thereto. In particular, since the neural network model 101 has performed the training of the first color space conversion and the resolution enlarging in advance based on a large number of the first training images, the trained neural network model 101 may accurately perform the first color space conversion and the resolution enlarging for each of the first target images and generate the second target image that meets the requirements.

In an embodiment, after obtaining the second target images, the processor 13 may sequentially input the second target images to the trained neural network model 102, so that the neural network model 102 sequentially performs the second color space conversion on the second target images. Then, the processor 13 may sequentially obtain multiple images (also called third target images) according to an output of the neural network model 102. Image data of each of the third target images conforms to the specifications of the first color space. In addition, each of the third target images may have the second resolution. That is, a resolution of each of the third target images may be equal to the resolution of each of the second target images.

It should be noted that since the neural network model 102 has performed the training of the second color space conversion in advance based on a large number of the second training images, the trained neural network model 102 may accurately perform the second color space conversion for each of the second target images and generate the third target image that meets the requirements.

In an embodiment, the processor 13 may establish a conversion matrix (also called a second conversion matrix) based on another conversion function (also called a second conversion function). The neural network model 102 may perform the second color space conversion on the second target image based on the second conversion matrix to obtain the third target image. For example, the second conversion function may include the following formulas (2.1) to (2.3), and the second conversion matrix may include a conversion matrix (2.4).

$$R \leftarrow Y + 1.403 \times (Cr - D) \tag{2.1}$$

$$G \leftarrow Y - 0.714 \times (Cr - D) - 0.344 \times (Cb - D) \tag{2.2}$$

$$B \leftarrow Y + 1.773 \times (Cb - D) \tag{2.3}$$

$$\begin{bmatrix} 1 & 1.403 & 0 \\ 1 & -0.714 & -0.344 \\ 1 & 0 & 1.773 \end{bmatrix} \tag{2.4}$$

In the formulas (2.1) to (2.3), D is a constant. In an embodiment, each of the pixel data in the second target image may carry a set of the color information of Y, Cr, and Cb, and each of pixel data in the third target image may carry a set of the color information of R, G, and B. Each of parameters in the conversion matrix (2.4) is a convolution operator used by the neural network model 102 when performing the second color space conversion. The neural network model 101 may perform the convolution operation on the second target image based on the conversion matrix (2.4) to generate the third target image. In addition, both the second conversion function and the second conversion matrix may be adjusted according to the practical requirements, such as adjustment for different color spaces, characteristics of the neural network model, and/or characteristics of the image to be processed, and the disclosure is not limited thereto.

In an embodiment, the processor 13 may reassemble the third target images into a video stream (also called a target video stream). Then, the processor 13 may provide the target video stream to the display of the electronic device 10 or an external display for playback. Compared to the original video stream generated by the camera lens 11, a series of images (i.e., the third target images) in the target video stream may have a higher resolution and better image playback quality, thereby improving subsequent image viewing experience of a user.

In an embodiment, by the neural network model 101 converting the first target image in the video stream generated by the camera lens 11 from the first color space to the second color space and performing the resolution enlarging based on the second color space to obtain the second target image, based on nature of the human eyes of being more sensitive to the color changes in the second color space, image defects caused by the resolution enlarging, such as distortion in image quality of the second target image that may be perceived by a viewer, may be reduced. In addition, in an embodiment, the second target image is converted from the second color space back to the first color space through the neural network model 102, which may meet the playback requirements for the third target image of most display devices (e.g., the display in the electronic device 10) that only support the image processing in the first color space, thereby avoiding compatibility issues of subsequent image playback caused by performing the first color space conversion.

FIG. 2 is a flowchart of an image adjustment method according to an embodiment of the disclosure. Referring to FIG. 2, in step S201, a training data set is established. The training data set includes multiple first training images and multiple second training images. The image data of each of the first training images conforms to the specifications of the first color space, and the image data of each of the second training images conforms to the specifications of the second color space. The first color space is different from the second color space. In step S202, the first training images are inputted to the first neural network model, so that the first neural network model performs the training of the first color space conversion and the resolution enlarging based on the first training images. In step S203, the second training images are inputted to the second neural network model, so that the second neural network model performs the training of the second color space conversion based on the second training images.

FIG. 3 is a flowchart of an image adjustment method according to an embodiment of the disclosure. Referring to FIG. 3, in step S204, an external image is captured through a camera lens to obtain a video stream. The video stream includes multiple first target images, and the image data of each of the first target images conforms to the specifications of first color space. In step S205, the first target images are sequentially inputted to the trained first neural network model, so that the first neural network model sequentially performs the first color space conversion and the resolution enlarging on the first target images, and sequentially obtains multiple second target images according to an output of the first neural network model. The image data of each of the second target images conforms to the specifications of the second color space. In step S206, the second target images are sequentially inputted to the trained second neural network model, so that the second neural network model sequentially performs the second color space conversion on the second target images, and sequentially obtains multiple third target images according to an output of the second neural network model. The image data of each of the third target images conforms to the specifications of the first color space.

However, each of the steps in FIGS. 2 and 3 has been described in detail above. Therefore, the same details will not be repeated in the following. It is worth noting that each of the steps in FIGS. 2 and 3 may be implemented as multiple program codes or circuits, and the disclosure is not limited thereto. In addition, the methods in FIGS. 2 and 3 may be used in conjunction with the above exemplary embodiments or may be used alone, and the disclosure is not limited thereto.

Based on the above, according to the image adjustment method and the electronic device in the disclosure, the neural network model built into the electronic device may automatically perform the first color space conversion, the resolution enlarging, and the second color space conversion on the consecutive images in the video stream generated by the camera lens without perceived by the user. In this way, the resolution of the consecutive images in the video stream may be efficiently improved without affecting (or even improving) image presentation quality of the consecutive images in the video stream and compatibility of subsequent playback of related images.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An image adjustment method, comprising:

establishing a training data set, wherein the training data set comprises a plurality of first training images and a plurality of second training images, image data of each of the first training images conforms to specifications of a first color space, image data of each of the second training images conforms to specifications of a second color space, and the first color space is different from the second color space;

inputting the first training images to a first neural network model to perform, by the first neural network model, training of first color space conversion and resolution enlarging based on the first training images;

inputting the second training images to a second neural network model to perform, by the second neural network model, training of second color space conversion based on the second training images;

capturing an external image through a camera lens to obtain a video stream, wherein the video stream comprises a plurality of first target images, and image data of each of the first target images conforms to the specifications of the first color space;

sequentially inputting the first target images to the trained first neural network model to sequentially perform, by the first neural network model, the first color space conversion and the resolution enlarging on the first target images, and sequentially obtain a plurality of second target images according to an output of the first neural network model, wherein image data of each of the second target images conforms to the specifications of the second color space; and sequentially inputting the second target images to the trained second neural network model to sequentially perform, by the second neural network model, the second color space conversion on the second target images, and sequentially obtain a plurality of third target images according to an output of the second neural network model, wherein image data of each of the third target images conforms to the specifications of the first color space.

2. The image adjustment method according to claim 1, wherein a resolution of each of the second training images is higher than a resolution of each of the first training images.

3. The image adjustment method according to claim 1, wherein a resolution of each of the second target images is higher than a resolution of each of the first target images.

4. The image adjustment method according to claim 3, wherein a resolution of each of the third target images is equal to the resolution of each of the second target images.

5. The image adjustment method according to claim 1, wherein the second color space at least comprises a brightness channel, and the first color space does not comprise the brightness channel.

6. An electronic device, comprising:

a camera lens;

a storage circuit; and a processor connected to the camera lens and the storage circuit, wherein the storage circuit is configured to store a first neural network model and a second neural network model, and the processor is configured to:

establish a training data set, wherein the training data set comprises a plurality of first training images and a plurality of second training images, image data of each of the first training images conforms to specifications of a first color space, image data of each of the second training images conforms to specifications of a second color space, and the first color space is different from the second color space;

input the first training images to the first neural network model to perform, by the first neural network model, training of first color space conversion and resolution enlarging based on the first training images;

input the second training images to the second neural network model to perform, by the second neural network model, training of second color space conversion based on the second training images;

capture an external image through the camera lens to obtain a video stream, wherein the video stream comprises a plurality of first target images, and image data of each of the first target images conforms to the specifications of the first color space;

sequentially input the first target images to the trained first neural network model to sequentially perform, by the first neural network model, the first color space conversion and the resolution enlarging on the first target images, and sequentially obtain a plurality of second target images according to an output of the first neural network model, wherein image data of each of the second target images conforms to the specifications of the second color space; and sequentially input the second target images to the trained second neural network model to sequentially perform, by the second neural network model, the second color space conversion on the second target images, and sequentially obtain a plurality of third target images according to an output of the second neural network model, wherein image data of each of the third target images conforms to the specifications of the first color space.

7. The electronic device according to claim 6, wherein a resolution of each of the second training images is higher than a resolution of each of the first training images.

8. The electronic device according to claim 6, wherein a resolution of each of the second target images is higher than a resolution of each of the first target images.

9. The electronic device according to claim 8, wherein a resolution of each of the third target images is equal to the resolution of each of the second target images.

10. The electronic device according to claim 6, wherein the second color space at least comprises a brightness channel, and the first color space does not comprise the brightness channel.

* * * * *